(12) United States Patent
Saros et al.

(10) Patent No.: US 8,890,661 B2
(45) Date of Patent: Nov. 18, 2014

(54) METHOD, APPARATUS AND COMPUTER PROGRAM PRODUCT FOR INVOKING LOCAL COMMUNICATION APPLICATION SERVICES

(75) Inventors: Jakob Saros, Solna (SE); Mattias Eld, Spanga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 336 days.

(21) Appl. No.: 13/265,700

(22) PCT Filed: Apr. 24, 2009

(86) PCT No.: PCT/SE2009/050433
§ 371 (c)(1),
(2), (4) Date: Oct. 21, 2011

(87) PCT Pub. No.: WO2010/123426
PCT Pub. Date: Oct. 28, 2010

(65) Prior Publication Data
US 2012/0044059 A1 Feb. 23, 2012

(51) Int. Cl.
*H04Q 5/22* (2006.01)
*H04W 4/02* (2009.01)
*H04L 29/08* (2006.01)
*H04W 4/18* (2009.01)
*H04M 1/725* (2006.01)

(52) U.S. Cl.
CPC ............ *H04W 4/02* (2013.01); *H04M 1/72525* (2013.01); *H04M 2250/04* (2013.01); *H04L 67/18* (2013.01); *H04W 4/18* (2013.01)
USPC ... 340/10.5; 340/10.1; 705/14.49; 705/14.58; 455/41.2; 455/414.1; 455/456.2

(58) Field of Classification Search
USPC ............. 340/10.1, 10.5; 726/4, 5, 9; 713/185; 725/25, 62, 86, 91, 98; 705/15, 319, 705/500, 14.49, 14.58; 709/204, 238; 455/41.1, 41.2, 41.3, 66.1, 414.1, 455/414.2, 456.1, 456.5, 461
See application file for complete search history.

(56) References Cited

U.S. PATENT DOCUMENTS

2004/0030930 A1* 2/2004 Nomura ......................... 713/201
2004/0139204 A1* 7/2004 Ergezinger et al. ........... 709/229

(Continued)

FOREIGN PATENT DOCUMENTS

EP 1534022 A1 5/2005
FR 2916070 A1 11/2008

(Continued)

OTHER PUBLICATIONS

Japanese Office Action from JP2012-507176, issued Apr. 2, 2013 with English Translation, 5 pages.

*Primary Examiner* — Brian Zimmerman
*Assistant Examiner* — Laura Nguyen
(74) *Attorney, Agent, or Firm* — Rothwell, Figg, Ernst & Manbeck, P.C.

(57) ABSTRACT

It is presented a method for invoking an application service in response to a tag reading by a mobile terminal. The method comprises the steps of: receiving an input message, the input message comprising data being associated with a tag read by the mobile terminal using local communication, the input message further comprising a recipient identifier linked to the mobile terminal; determining, using a plurality of parameters associated with the tag reading, a plurality of matching application servers, wherein conditions of a tag reading subscription for each of the matching application servers matches the plurality of parameters; and sending an invocation message to each of the matching application servers to invoke a respective application service of each of the matching application servers, the invocation message comprising the recipient identifier enabling each of the application services to send content to the user equipment and the tag data.

13 Claims, 6 Drawing Sheets

(56) References Cited

U.S. PATENT DOCUMENTS

| | | |
|---|---|---|
| 2006/0293085 A1 | 12/2006 | Lauper |
| 2007/0011087 A1 | 1/2007 | Waris |
| 2008/0004985 A1 | 1/2008 | Kang |
| 2008/0297311 A1* | 12/2008 | Wu ............................ 340/10.1 |
| 2009/0315670 A1* | 12/2009 | Naressi et al. ................ 340/5.8 |
| 2010/0130179 A1* | 5/2010 | Colligan et al. ........... 455/414.1 |
| 2012/0019365 A1* | 1/2012 | Tuikka et al. ................ 340/10.1 |

FOREIGN PATENT DOCUMENTS

| | | |
|---|---|---|
| JP | 2007527173 A | 9/2007 |
| JP | 2007317112 A | 12/2007 |
| WO | 02/082363 A1 | 10/2002 |

* cited by examiner

METHOD, APPARATUS AND COMPUTER PROGRAM PRODUCT FOR INVOKING LOCAL COMMUNICATION APPLICATION SERVICES

CROSS-REFERENCE TO RELATED APPLICATION

This application is a 35 U.S.C. §371 National Phase Entry Application from PCT/SE2009/050433, filed Apr. 24, 2009, and designating the United States.

TECHNICAL FIELD

The invention relates generally to local communication, and more particularly to invoking application services in such systems.

BACKGROUND

Near Field Communication (NFC) technology is predicted to be included in mass-market mobile devices in the coming years and will enable new application services like payment and ticketing in mobile devices. NFC uses short-range RFID technologies, typically at 13.56 MHz, and contactless card technologies such as Mifare.

One example of how NFC can be used is "smart posters", which are physical posters with NFC tags attached to them. The NFC tags can for example link to a webpage or contain data that can be processed by an application on the NFC device. A smart poster could be attached to a bus stop where tags contain information about timetables or journey planners that can be processed by an application, e.g. a Java MIDlet.

In the prior art, if a public transport company that decides to put NFC tags on bus stops, the company typically has a specific purpose for every tag they issue, e.g. a tag for timetables or a tag for downloading tickets to a mobile device.

With the systems of the prior art, the purpose of the tag is decided at installation, or requires cumbersome rewriting of data to the tags.

A system called Colorcode, details available at the web address http://www.colorzip.co.jp/en/ at the time of filing of this application, allows addresses to be registered with a particular code in a server. However, there is very limited flexibility in terms of application service selection.

Consequently, there is a need for a more flexible and expandable way of invoking application services in response to near field communication tag reading.

SUMMARY

An object of the invention is to simplify profile management for user profiles in a networking system.

According to a first aspect of the invention, it is presented a method for invoking application services in response to a tag reading by a mobile terminal. The method comprises the steps, performed in a service broker server, of: receiving an input message, the input message comprising tag data being associated with a tag read by the mobile terminal using local communication, the input message further comprising a recipient identifier linked to the mobile terminal; determining, using a plurality of parameters associated with the tag reading, a plurality of matching application servers, wherein conditions of a tag reading subscription for each of the matching application servers matches the plurality of parameters; and sending an invocation message to each of the matching application servers to invoke a respective application service of each of the matching application servers, the invocation message comprising the recipient identifier enabling each of the application services to send content to the user equipment and the tag data.

Dynamic invocation of application services of application servers is thus enabled. In other words, there is no static link between tag id and application. Such dynamic invocation allows for new opportunities for the owner of the tags, where third party application providers can purchase content delivery to tags matching specific conditions, e.g. geography, time, user group, etc. By allowing for a plurality of application servers to be invoked from a single tag reading, even more relationships and opportunities between tag owners and application providers is created.

The plurality of parameters may be associated with at least two of the following: a physical location of the tag being read, a deployment status of the tag, a time of day of the tag reading, a date of the tag reading.

In the step of receiving an input message, the input message may be received from a tag manager server which stores data associated with the detected tag.

The tag manager server may be located remotely from the service broker server.

In the step of receiving an input message, the input message may be received from an application server.

In the step of receiving an input message, the input message may be received from the mobile terminal.

The method may be arranged such that the tag data is only sent to application servers being authorised to receive the tag data.

The method may comprise the step, prior to the step of sending an invocation message, of obtaining supplemental recipient data associated with the recipient, and wherein the step of determining uses one or more parameters of the recipient data to determine a match.

In the step of determining, each of the plurality of application services may be linked to the recipient identifier. In other words, there can be a link between a user and the plurality of matching application services.

The method may further comprise the step, prior to the step of sending an invocation message, of obtaining an application programming interface of at least one of the application services, and the invocation message may comprise data related to the application programming interface.

A second aspect of the invention is a service broker server for invoking application services in response to a tag reading by a mobile terminal. The service broker server comprises: a controller; a memory (16) configured to store tag reading subscriptions; a message receiver configured to receive an input message from the mobile terminal, the input message comprising a tag data associated with a tag read by the mobile terminal using local communication, the input message further comprising a recipient identifier linked to the mobile terminal; a determiner configured to determine, using a plurality of parameters associated with the tag reading, a plurality of matching application servers, wherein conditions of a tag reading subscription for each of the matching application servers matches the plurality of parameters, wherein the tag reading subscription is stored in the memory; and a message transmitter for sending an invocation message to each of the matching application servers to invoke a respective application service of each of the matching application servers, the invocation message comprising the recipient identifier enabling each of the application services to send content to the user equipment and the tag data.

A third aspect of the invention is a system comprising: a service broker server according to the second aspect and a tag manager server comprising a database configured to provide tag data for a specific tag identifier comprising data entries, wherein each data entry comprises a tag identifier and tag data; a receiver configured to receive a tag identity message comprising a tag identifier; a data retriever configured to retrieve tag data associated with the tag identifier of the tag identity message from the database; and a transmitter configured to send the retrieved tag data to a service broker server for determining an application service.

A fourth aspect of the invention is a computer program for invoking an application service in response to a tag detection by a mobile terminal, the computer program comprising computer program code which, when run on a service broker server, causes the service broker server to: receive an input message, the input message comprising tag data being associated with a tag detected by the mobile terminal using local communication, the input message and a recipient identifier linked to the mobile terminal; determine, using a plurality of parameters associated with the tag reading, a plurality of matching application servers, where conditions of a tag reading subscription for each of the matching application servers matches the plurality of parameters; and send an invocation message to each of the matching application servers to invoke a respective application service of each of the matching application servers, the invocation message comprising the recipient identifier enabling each of the application services to send content to the user equipment and the tag data.

A fifth aspect of the invention is a computer program product comprising a computer program according to the fourth aspect and a computer readable means on which the computer program is stored.

It is to be noted that any feature of the first, second, third, fourth and fifth aspects may, where appropriate, be applied to any other aspect.

Whenever the phrase local communication is used herein, it is to be construed as a direct wireless communication between two objects. This can for instance be implemented using radio transmission, optical reading, inductive coupling, etc. For example, when local communication is used to detect, using a mobile terminal, tag data associated with a tag, the tag data is detected without any intermediate links between the mobile terminal and the tag data. For example, local communication can be performed using near field communication, Bluetooth, one dimensional barcode reading such as EAN (European Article Number), two dimensional barcode reading such as QR (Quick Response) code or Datamatrix, or any combination of the above.

Whenever the term application service is used herein, it is to be construed as a service running on a server with an application that is directly or indirectly useful or desirable for an end user.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The word 'plurality' in the description and claims shall be interpreted as meaning 'more than one'.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
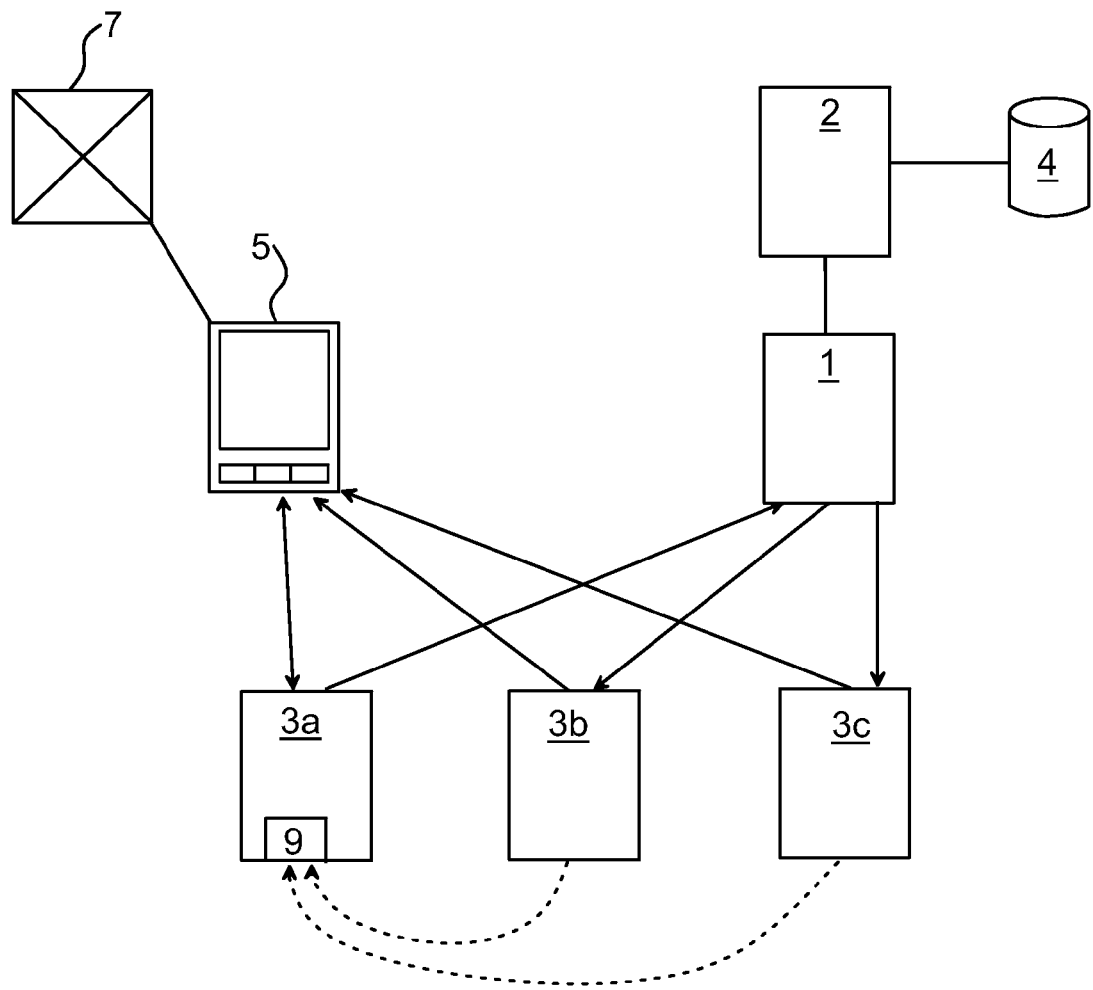
FIGS. 1a-c are schematic diagrams illustrating an environment where an embodiment of the present invention can be deployed.
Figure 1B:
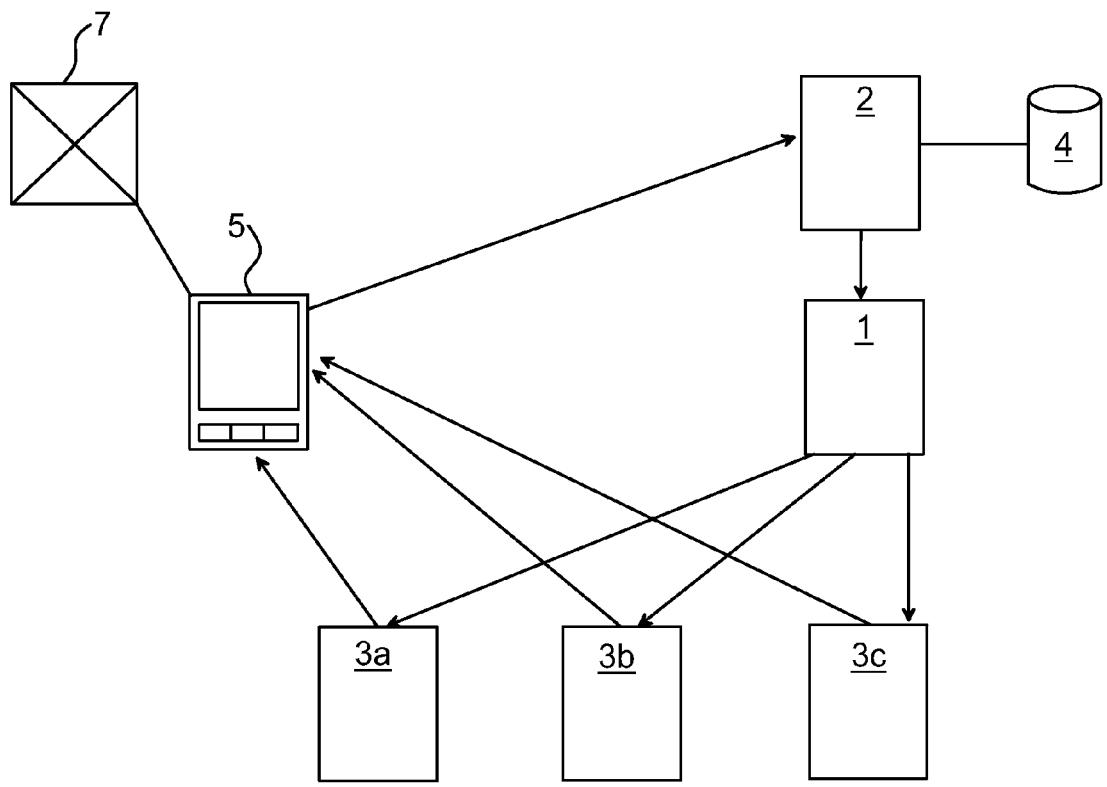
Figure 1C:
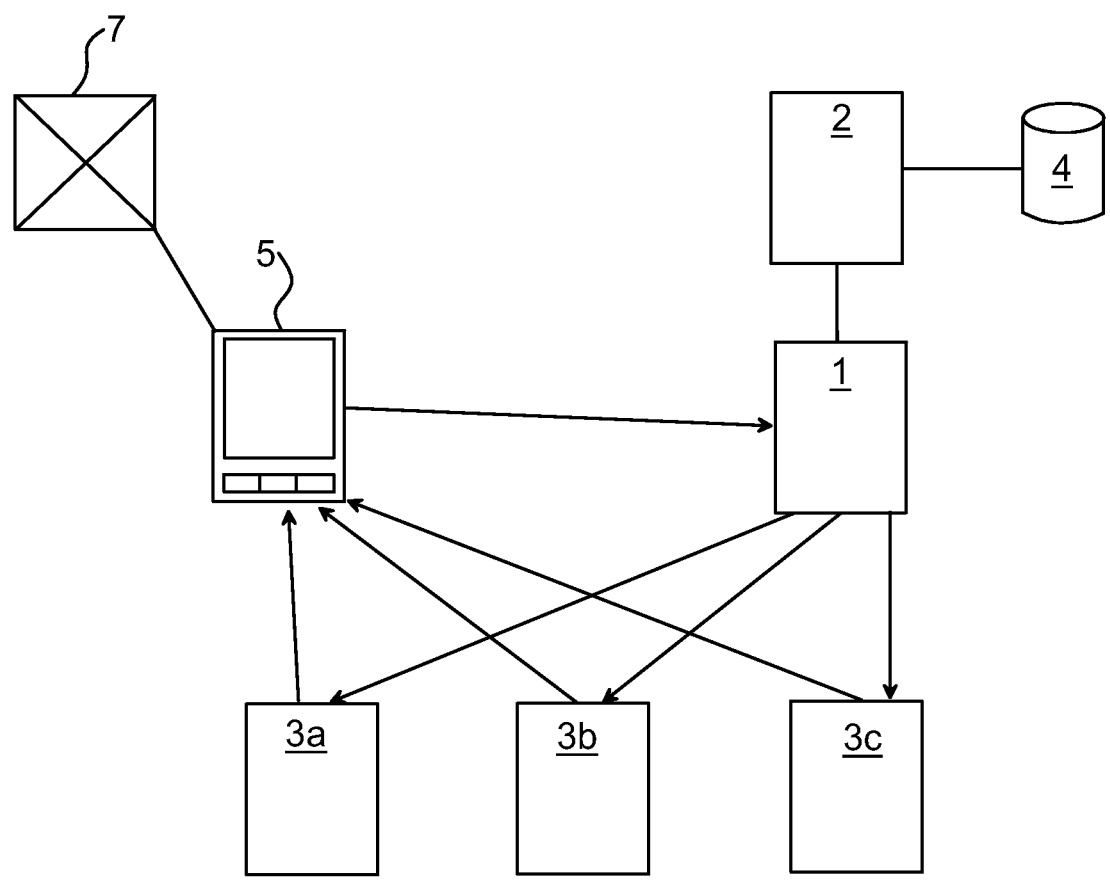

FIGS. 1a-c are schematic diagrams illustrating an environment where an embodiment of the present invention can be deployed. The components of FIGS. 1a-c are equivalent, but the communication paths vary.

The system includes an NFC tag 7, which can communicate with a mobile terminal 5. Three application servers 3a-c are capable of sending data to the mobile terminal 5. The application servers are servers capable of delivering content to the mobile terminal 5. Each application server hosts at least one application service, which is the software which effects the content delivery. A service broker server 1 is configured to, depending on data in an input message as detailed further below, invoke one or more of the application services of the application servers 3a-c.

A tag manager server 2 has an associated database 4. The database 4 can be any suitable database for storing tag data, e.g. comprising magnetic storage, optical storage, flash memory, random access memory (RAM) or any combination of the above. The tag manager server 2, with the associated database 4, can retrieve tag data, e.g. based on a tag identifier.

The database 4 contains data entries where each entry comprises a tag identifier and tag data. The tag identifier can be a unique string or number. The tag data can for example comprise the physical location (e.g. in global location co-ordinates which can be generated from a GPS (global positioning system) receiver) of a tag or the deployment status of a tag. Deployment statuses can for instance be that the tag is not deployed yet, that it is deployed and active, that it is deployed and intentionally disabled or that it is deployed and malfunctioning. The tag data can also comprise access rights, defining what application servers (and/or application services) are allowed to access data related to a particular tag. The access rights can be part of a more general access policy. The tag data can even comprise the access policy or access rules, rather, or in addition to, the access rights. The access rights can restrict access on a data field basis or for the entire tag. Additionally, the tag data can comprise data about who is the owner of the tag or application service specific parameters, describing how the tag is to be used by a particular application service. Furthermore, a signature or certificate can be included, allowing the integrity of the tag to be verified. The signature can for example comply with signature definitions as specified by the NFC Forum. The tag data can also include usage data, such as the number of times the tag has been read and data regarding one or more of the last readings, and/or statistics about readings, such as time of day of readings, etc. Data about the users having read the tag can also be included in the tag data. Depending on the source of the tag data, the tag data of the tag manager is entered/updated from the service broker 1, or at deployment of the tag. Additionally, a management interface can allow an administrative user to update tag data in the tag manager 2.

The tag manager server 2 is also typically responsible for issuing tags as well as storing any updates to information about each particular tag that is within its responsibility. The database 4 can be integrated in or separate from the tag manager server 2.

The following example will describe a scenario in which the application server 3*a* belongs to a public transport operator deploying NFC tags 7 on bus stops. The application server 3*b* belongs to an advertisement application service wishing to display advertisements relating to tags at different locations. The application server 3*a* is connected to the tag manager 2. Furthermore, the tag manager 2 is connected to the service broker 1, which is able to notify the application server 3*b* when a tag 7 is read, where the tag fits a profile for the application service of the application server 3*b*.

The public transport operator decides to deploy tags 7 at certain locations, i.e. in this case bus stops. The tag manager 2 can be used for issuing tags and later management of tag data, such as updating information about a tag. Tag information, such as content and location, is stored in the database 4.

The tag manager 2 publishes its registry of tags to the service broker 1 so that the service broker 1 is aware of these tags and where to find more detailed information.

The public transport application service is able to set access to right to its tags in order to control what application servers are allowed to see tag information.

The access rights can be set for all data on a tag, or only specific data on each tag. The access rights are handled using the tag manager 2, where the access rights are stored in the database 4. The tag manager 2 will also publish the access information to the service broker 1. Optionally, the public transport application service can publish an application programming interface (API) 9 to be stored in the service broker 1. This API could be used for sending content from the ad application service of the application server 3*b* to the public transport application service of the application server 3*a*. The public transport application service can in this way combine content from the ad application service with its own content for delivery to the mobile terminal 5. In this case, the public transport company retains control of how content is combined, e.g. in a separate space in a web page (using hypertext mark-up language, HTML) or in other content such as a slide or separate space of a multimedia message service (MMS) message or as a separate text in a short message service (SMS) message.

The ad application service (using the application server 3*b*) can then start to subscribe to tags from specific locations, tags read by specific users, tags from specific service providers etc, by sending an appropriate subscription request to the service broker 1. It is to be noted that any of the application servers 3*a-c* can submit a subscription request to the service broker 1. The subscription request contains one or more conditions defining the segment of tags that the application server in question would like to be notified of. Any of the parameters mentioned above with reference to the database 4 can be used. Each condition contains a parameter and a value or range which should be satisfied. Optionally, the subscriptions are managed, or at least approved, from an administration interface to the service broker 1. This allows the tag owner to control the application service invocation, allowing the tag owner, or an intermediary, such as the party responsible for the service broker 1, to charge for the subscriptions.

The service broker 1 can register and remove several listeners for a tag. In other words, each tag can invoke one or more application services on one or more application servers 3*a-c*.

A user reads a tag at a bus stop using an NFC device, in this case referred to as the mobile terminal 5. An application that is present on the device processes the content on the tag.

The mobile terminal 5 notifies the system that it has read the tag. This can occur in various ways. FIG. 1*a* illustrates the case where the mobile terminal 5 notifies the application server 3*a* which in turn notifies the tag manager 2 which in turn notifies the service broker 1.

Alternatively, the mobile terminal 5 connects directly to the tag manager 2 or the service broker 1 as illustrated in FIG. 1*b* or 1*c*. In this way, the additional tag data can also be resolved on its way to the service broker 1 so that the service broker 1 will receive information about the event such as the user, the location, content on the tag and the application service which was initially contacted.

The service broker 1 notifies any relevant listeners, e.g. the application server 3*b*, with data related to the tag reading, e.g. tag data and user data, and forwards information to the application server 3*b*. The application server 3*b* is now capable of processing this information to generate content. The content can be pushed to the recipient, i.e. the user, using information about the recipient, e.g. the phone number (MSISDN) or an IP address. Alternatively, the content is fed to the application server 3*a* using the API 9 as received from the service broker 1. In this way, the application server 3*a* can in turn push content to the mobile terminal. For example, consider the following scenario to illustrate the use of application data from the application server 3*a* in the application server 3*b*. The user has read a tag containing information about the next departure of a particular bus. The application server 3*b* receives this information along with the information to the user (recipient) which is that the next bus is delayed and will arrive in 15 minutes. The application server 3*b* responds with a coupon for discounted coffee, to be used at a nearby convenience store. If the information had been that the bus would arrive in 1 minute the service broker 1 may have chosen not to notify an application servers based on this information.

The mobile terminal can display content in a plurality of ways, e.g using a local application such as a Java MIDlet, using a web browser or any other type of content browser, or by displaying an SMS or MMS containing the content.

With the system described above, the problem of attaching and removing multiple application services to NFC tags is solved, thus enabling more application services in the NFC eco-system by making tags dynamic. This allows owners of a set of tags, e.g. the public transport company in the example above, to utilise the asset of the tags and sell the ability to send alternative or additional content to users reading a tag. Moreover, the selection of content providers (i.e. application servers) is dynamic and can be sliced in a multitude of different ways using the available variables.

Figure 2:
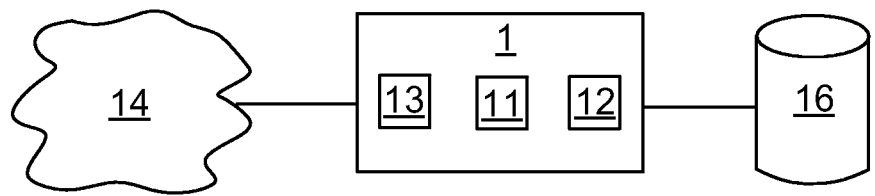
FIG. 2 is a schematic diagram illustrating the service broker server 1 of FIG. 1.

FIG. 2 is a schematic diagram illustrating the service broker server 1 of FIG. 1. The service broker server 1 comprises a network interface 13 which is known per se and allows the service broker 1 to communicate using the network 14, e.g. to the tag manager 2, the application servers 3*a*-*c* and/or the mobile terminal 5. Furthermore, the service broker 1 comprises a controller 11, such as a central processing unit (CPU) and a computer program stored in an internal memory 12. The internal memory 12 can thus be a computer program product to hold software instructions which are to be executed by the controller 11, e.g. to perform the method described with reference to FIG. 3 below. The internal memory can be any suitable memory e.g. comprising at least one of magnetic storage, optical storage, solid state storage, read only memory (ROM), and random access memory (RAM).

The service broker 1 is also connected to a memory 16 which stores the subscriptions of application servers to NFC events. The subscriptions contain one or more conditions on parameters that, when met, will trigger the invocation of the subscribing application server.

The parameters can for example be a user property, a tag location area, content on the tag, deployment status of the tag, a time or date of reading. Optionally, the service broker 1 is provided with a user interface (not shown). The parameter values which are used to evaluate the condition can, for example, originate from the tag manager 1, the service broker 1 or the mobile terminal 5.

Figure 3:
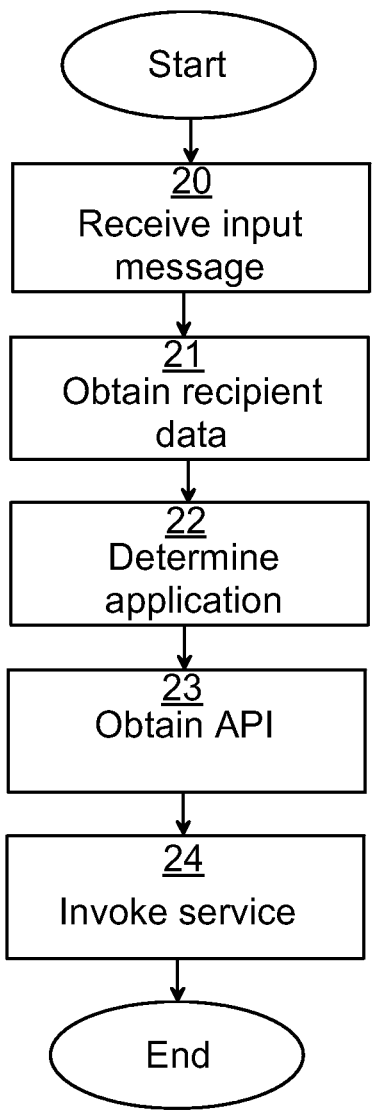
FIG. 3 is a flow chart illustrating a method performed in the service broker 1 of FIGS. 1a-c.

FIG. 3 is a flow chart illustrating a method performed in the service broker 1 of FIGS. 1*a*-*c*. The method is performed when the user of the mobile terminal 5 reads a tag 7.

In an initial step 20 to receive input message, an input message is received. The input message comprises at least tag data and recipient data. The recipient is the user which has read the NFC using the mobile terminal. The tag data is data associated with the tag, which is the responsibility of the tag manager. The tag data can be obtained by querying the tag manager with a tag identifier included in the input message. Alternatively, the tag data is included in the input message. The tag data can be one or more of the parameters described with reference to the database 4 of FIG. 1 above.

In an optional step 21 to obtain recipient data, additional data about the recipient is obtained. This can include any relevant personal data, including age, home address, mobile network operator, usage history, etc. This data can be stored by the service broker 1 or it can be obtained from another server (not shown).

In a step 22 to determine application, an application to be invoked is determined. This step uses the tag data, and optionally recipient data, to determine what application to invoke. The service broker uses all available relevant parameter values and the conditions in the application server subscriptions to determine what subscriptions match the current set of parameters. This step is not limited to find only one application server; rather, using messages (e.g. SMS/MMS) or content aggregation, e.g. using application APIs, multiple application servers can be invoked from a single NFC read and still send relevant and user friendly content to the recipient. Optionally, only authorised application servers are determined to be matched. In other words, application servers/application services which are not authorised are not considered to be a match.

In an optional step 23 to obtain API, any relevant APIs are obtained.

In the step to invoke service 24, any matching application services of application servers from the determine application step 22 are invoked. The invocation is effected by an invocation message from the service broker to each of the matching applications. The invocation message includes the obtained tag data.

Optionally, the invocation message is split into several messages.

Figure 4A:
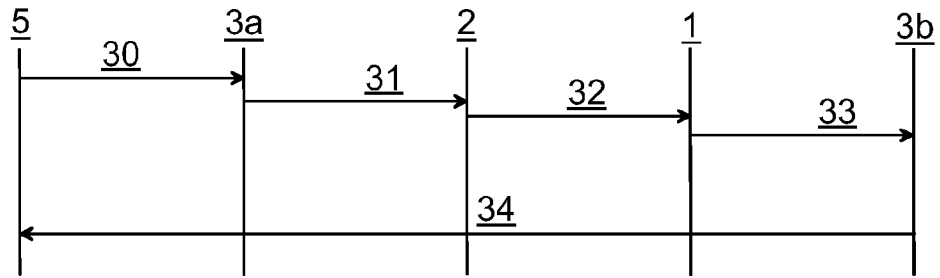
FIG. 4a is a sequence diagram illustrating application service invocation in the system of FIG. 1a, FIG. 4b is a sequence diagram illustrating application service invocation in the system of FIG. 1b.

FIG. 4*a* is a sequence diagram illustrating application service invocation in the system of FIG. 1*a*. The involved nodes are the mobile terminal 5, the application server 3*a*, the tag manager 2, the service broker 1 and the application server 3*b*.

The mobile terminal 5 reads an NFC tag and sends 30 a message to the application server 3*a* to inform about the read operation. Optionally, the mobile terminal 5 retrieves content from the tag and performs application processing on its own. The application server 3*a* (along with any processing of its own) sends 31 a message including the tag identifier to the tag manager 2, which retrieves any tag data for the tag in question. The tag manager 2 then sends 32 the tag data, along with recipient data to the service broker 1. The service broker 1 determines, based on subscription entries and optional authorisation rules, that the application server 3*b* should be invoked, and sends 33 an invocation message to the application server 3*b*. The application server 3*b* then performs any necessary processing to generate content and sends 34 the content directly to the mobile terminal 5, e.g. using push technology such as SMS or MMS, or triggers the mobile terminal to open a web browser with a specific URL to make the mobile terminal 5 retrieve the content from the application server 3*b*. In this scenario, data which is specific for the application server 3*a* can thus be included in the message to the service broker 1, allowing application service invocation to depend on application specific parameters.

Figure 4B:
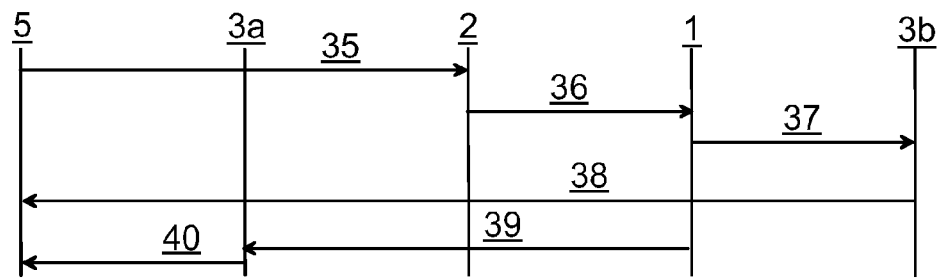
FIG. 4c is a sequence diagram illustrating application service invocation in the system of FIG. 1c.
FIG. 4d is a sequence diagram illustrating the use of an application programming interface.

FIG. 4*b* is a sequence diagram illustrating application service invocation in the system of FIG. 1*b*, where the mobile terminal 5 directly connects with the tag manager 2. Again, the involved nodes are the mobile terminal 5, the application server 3*a*, the tag manager 2, the service broker 1 and the application server 3*b*.

The mobile terminal 5 reads an NFC tag and sends 35 a message directly to the tag manager 2 to inform about the read operation. The tag manager 2 retrieves any tag data for the tag in question and sends 36 the tag data, along with recipient data to the service broker 1. The service broker 1 determines, based on subscription entries and optional authorisation rules, that the application server 3*b* should be invoked, and sends 37 an invocation message to the application server 3*b*. The application server 3*b* then performs any necessary processing to generate content and sends 38 the content directly to the mobile terminal 5, as mentioned with reference to FIG. 4*a* above. Additionally, the service broker determines that the application server 3*a* also should be invoked, and sends 39 an invocation message to the application server 3*a*. The application server 3*a* then performs any necessary processing to generate content and sends 40 the content directly to the mobile terminal 5, as mentioned with reference to FIG. 4*a* above.

Figure 4C:
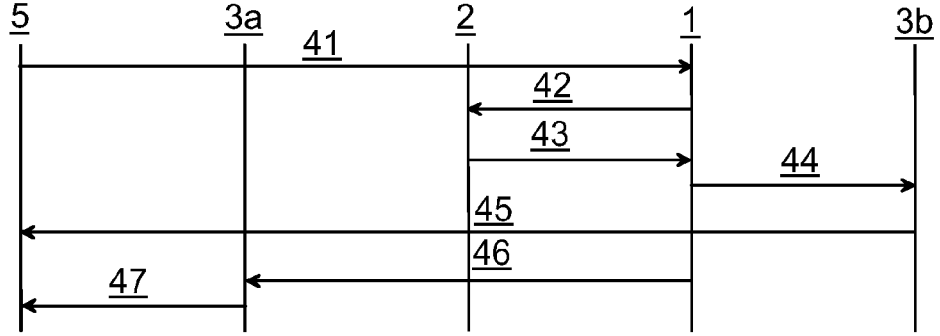

FIG. 4*c* is a sequence diagram illustrating application service invocation in the system of FIG. 1*c*, where the mobile terminal 5 directly connects with the service broker 1. Again, the involved nodes are the mobile terminal 5, the application server 3*a*, the tag manager 2, the service broker 1 and the application server 3*b*.

The mobile terminal 5 reads an NFC tag and sends 41 a message to the service broker 1 to inform about the read operation. The service broker 1 queries 42 the tag manager for tag data for the tag with the tag identifier specified in the message from the mobile terminal 5. The tag manager 2 retrieves any tag data for the tag in question and sends a response 43 with the tag data to the service broker 1. The service broker 1 determines, based on subscription entries and optional authorisation rules, that the application server 3*b* should be invoked, and sends 44 an invocation message to the application server 3b. The application server 3b then performs any necessary processing to generate content and sends 45 the content directly to the mobile terminal 5, as mentioned with reference to FIG. 4a above. Additionally, the service broker determines that the application server 3a also should be invoked, and sends 46 an invocation message to the application server 3a. The application server 3a then performs any necessary processing to generate content and sends 47 the content directly to the mobile terminal 5, as mentioned with reference to FIG. 4a above.

Figure 4D:
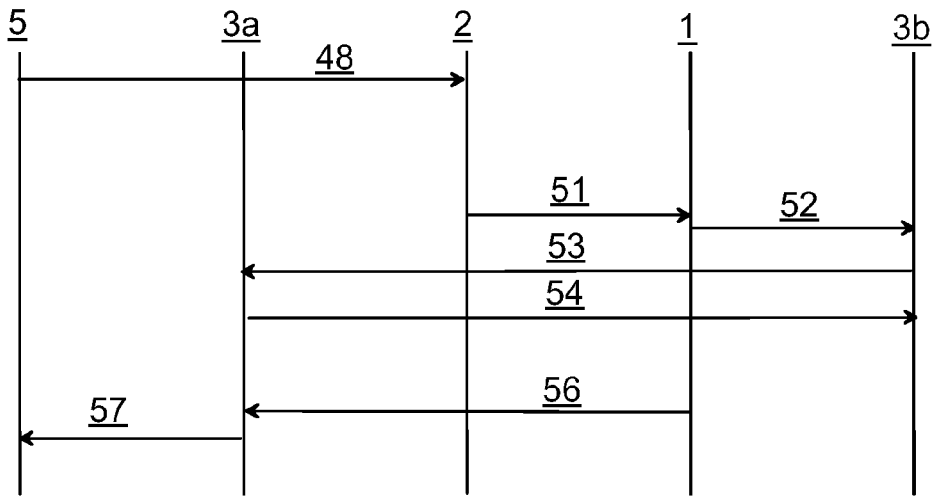

In FIG. 4d, the application server 3b makes use of an API to send content to the mobile terminal 5 via the application server 3a. Again, the involved nodes are the mobile terminal 5, the application server 3a, the tag manager 2, the service broker 1 and the application server 3b.

The mobile terminal 5 reads an NFC tag and sends 48 a message to the tag manager 2 to inform about the read operation. The tag manager 2 retrieves any tag data for the tag in question and sends 51 the tag data, along with recipient data to the service broker 1. The service broker 1 determines, based on subscription entries and optional authorisation rules, that the application server 3b should be invoked, and sends 52 an invocation message to the application server 3b. Here, the invocation message contains an API to allow the application server 3b to communicate with the application server 3a. The application server 3b then performs any necessary processing to generate content and sends 53 the content to the application server 3a. The application server 3a is then responsible for the content delivery from the application server 3b to the mobile terminal 5. Optionally, the service broker determines that the application server 3a also should be invoked, and sends 56 an invocation message to the application server 3a. The application server 3a then performs any necessary processing to generate content, combines the content from itself 3a and the application server 3b, and sends 57 the content directly to the mobile terminal 5, as mentioned with reference to FIG. 4a above.

Figure 5:
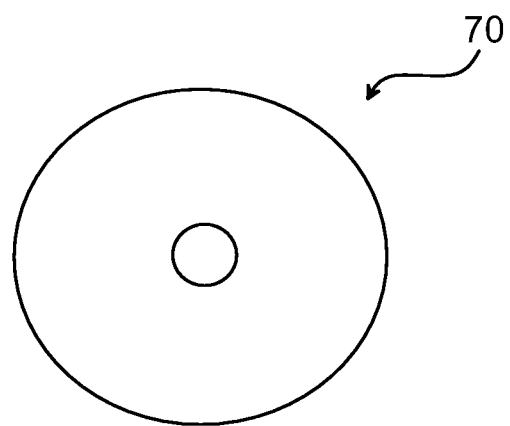
FIG. 5 shows one example of a computer program product comprising computer readable means.

FIG. 5 shows one example of a computer program product comprising computer readable means. On this computer readable means a computer program can be stored, which computer program can cause a computer to execute the method according to embodiments described herein. In this example, the computer program product is a optical disc, such as a CD (compact disc) or a DVD (digital versatile disc). The computer readable means can also be solid state memory, such as flash memory or a software package distributed over a network, such as the Internet.

While the examples in the description above discloses the use of NFC tags of a public transport company for third party usage, the invention is not limited to this example. Any system where NFC tags are to be used by more than one application server can apply the teaching of this document.

It is to be noted that while it is above illustrated the use of three application servers, any suitable number of servers can be used.

Whenever the term server is used herein, any suitable computer capable of performing the tasks as described can be used. For example, computers running operating systems such as Linux, MS Windows, Apple Mac OS, UNIX variants, etc. can be used. Any server contains a processor (e.g. a CPU), primary memory, such a RAM and has access to persistent storage, such as magnetic storage, solid state storage, optical storage or any combination of these.

Here now follows some further optional aspects of the service broker.

For use with the service broker, the plurality of parameters can be associated with at least two of the following: a physical location of the tag being read, a deployment status of the tag, a time of day of the tag reading, a date of the tag reading.

The message receiver of the service broker can, when the input message is received, receive the input message from the tag manager server 2 which stores data associated with the detected tag 7.

The tag manager server 2 can be located remotely from the service broker server 1.

The message receiver of the service broker can, when the input message is received, receive the input message from an application server 3a-c.

The message receiver of the service broker can, when the input message is received, receive the input message from the mobile terminal 5.

The service broker server can be configured to only send the tag data to application servers 3a-c being authorised to receive the tag data.

The service broker server can further comprise a supplemental receiver data module configured to obtain supplemental recipient data associated with the recipient. This supplemental recipient data can be used by the determiner to determine a match.

The determiner can be configured such that each of the plurality of application services is linked to the recipient identifier.

The service broker server can further comprise an API receiver module, configured to obtain an API 9 of at least one of the application services. The API can be included in the invocation message.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for invoking application services in response to a tag reading by a mobile terminal, the method comprising the steps, performed in a service broker server, of:
receiving an input message, the input message comprising tag data being associated with a tag read by the mobile terminal using local communication, the input message further comprising a recipient identifier linked to the mobile terminal;
determining, using a. plurality of parameters associated with the tag reading, a plurality of matching application servers, wherein conditions of a tag reading subscription for each of the matching application servers matches the plurality of parameters; and
sending an invocation message to each of the matching application servers to invoke a respective application service of each of the matching application servers, the invocation message comprising the recipient identifier enabling each of the application services to send content to the user equipment and the tag data,
wherein the step of determining the plurality of matching application servers includes:
determining that an advertisement application server is a matching application server when a parameter associated with the tag reading indicates a location coordinate of the tag; and
determining that a different advertisement application server is a matching application server when a parameter associated with the tag reading indicates a different location coordinate of the tag.

2. The method according to claim 1, wherein the plurality of parameters are associated with at least two of the following: a physical location of the tag being read, a deployment status of the tag, a time of day of the tag reading, and a date of the tag reading.

3. The method according to claim 1, wherein in the step of receiving an input message, the input message is received from a tag manager server which stores data associated with the detected tag, 4. The method according to claim 3, wherein the tag manager server is located remotely from the service broker server.

5. The method according to claim 1, wherein in the step of receiving an input message the input message is received from an application server, 6. The method according to claim 1, wherein in the step of receiving an input message, the input message is received from the mobile terminal.

7. The method according to claim 1, wherein the tag data is only sent to application servers being authorised to receive the tag data.

8. The method according to claim 1, further comprising the step, prior to the step of sending an invocation message, of obtaining supplemental recipient data associated with the recipient, and wherein the step of determining uses one or more parameters of the recipient data to determine a match.

9. The method according to claim 1, wherein in the step of determining, each of the plurality of application services is linked to the recipient identifier.

10. The method according to claim 1, further comprising the step, prior to the step of sending an invocation message, of obtaining an application programming interface of at least one of the application services, and the invocation message comprises the data related to the application programming interface.

11. A service broker server for invoking application services in response to a tag reading by a mobile terminal, the service broker server comprising:
a controller;
a memory configured to store tag reading subscriptions;
a message receiver configured to receive an input message from the mobile terminal, the input message comprising a tag data associated with a tag read by the mobile terminal using local communication, the input message further comprising a recipient identifier linked to the mobile terminal;
a determiner configured to determine, using a plurality of parameters associated with the tag reading, a plurality of matching application servers, wherein conditions of a tag reading subscription for each of the application servers matches the plurality of parameters, wherein the tag reading subscription is stored in the memory; and
a message transmitter for sending an invocation message to each of the matching application servers to invoke a respective application service of each of the matching application servers, the invocation message comprising the recipient identifier enabling each of the application services to send content to the user equipment and the tag data, wherein the determiner is configured to determine the plurality of matching application servers by:
determining that an advertisement application server is a matching application server when a parameter associated with the tag reading indicates a location coordinate of the tag; and
determining that a different advertisement application server is a matching application server when a parameter associated with the tag reading indicates a different location coordinate of the tag.

12. A system comprising:
a service broker server according to claim 11; and
a tag manager server comprising a database configured to provide tag data for a specific tag identifier comprising data entries, wherein each data entry comprises a tag identifier and tag data;
a receiver configured to receive a tag identity message comprising a tag identifier;
a data retriever configured to retrieve tag data associated with the tag identifier of the tag identity message from the database; and
a transmitter configured to send the retrieved tag data to a service broker server for determining an application service.

13. A computer program product comprising a computer program for invoking application services in response to a tag detection by a mobile terminal and comprising a non-transitory computer readable means on which the computer program is stored, the computer program comprising computer program code which, when run on a service broker server, causes the broker server to:
receive an input message, the input message comprising tag data being associated with a tag detected by the mobile terminal using local communication, the input message and a recipient identifier linked to the mobile terminal;
determine, using a plurality of parameters associated with the tag reading, a plurality of matching application servers, where conditions of a tag reading subscription for each of the matching application servers matches the plurality of parameters; and
send an invocation message to each of the matching application servers to invoke a respective application service of each of the matching application servers, the invocation message comprising the recipient identifier enabling each of the application services to send content to the user equipment and the tag data,
wherein the computer program code is configured to cause the service broker server to determine the plurality of matching application servers by:
determining that an advertisement application server is a matching application server when a parameter associated with the tag reading indicates a location coordinate of the tag; and
determining that a different advertisement application server is a matching application server when a parameter associated with the tag reading indicates a different location coordinate of the tag.

* * * * *

UNITED STATES PATENT AND TRADEMARK OFFICE
CERTIFICATE OF CORRECTION

PATENT NO. : 8,890,661 B2  
APPLICATION NO. : 13/265700  
DATED : November 18, 2014  
INVENTOR(S) : Saros et al.

Page 1 of 1

It is certified that error appears in the above-identified patent and that said Letters Patent is hereby corrected as shown below:

Specification

In Column 7, Line 24, delete "manager 1," and insert -- manager 2, --, therefor.

Claims

In Column 10, Line 47, in Claim 1, delete ""using a." and insert -- using a --, therefor.

In Column 11, Line 9, in Claim 3, delete "tag," and insert -- tag. --, therefor.

In Column 11, Line 13, in Claim 5, delete "message" and insert -- message, --, therefor.

In Column 11, Line 14, in Claim 5, delete "server," and insert -- server. --, therefor.

Signed and Sealed this
Seventeenth Day of May, 2016

Michelle K. Lee
*Director of the United States Patent and Trademark Office*